United States Patent
Goetzl et al.

(10) Patent No.: US 8,803,692 B2
(45) Date of Patent: Aug. 12, 2014

(54) DOCKING SYSTEM AND APPARATUS TO TRACK AND STIMULATE AN ANIMAL

(75) Inventors: Brent Andrew Goetzl, Orinda, CA (US); Aaron Russell, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 336 days.

(21) Appl. No.: 13/311,129

(22) Filed: Dec. 5, 2011

(65) Prior Publication Data

US 2013/0141237 A1    Jun. 6, 2013

(51) Int. Cl.
*G08B 23/00*    (2006.01)

(52) U.S. Cl.
USPC .............. 340/573.3; 340/573.1; 340/686.1; 119/712; 119/720

(58) Field of Classification Search
CPC ..... A01K 15/00; A01K 15/02; A01K 15/021; A01K 15/022; A01K 15/023; A01K 15/029; A01K 25/00; A01K 27/00; A01K 27/001; A01K 27/002; A01K 27/009; A01K 1/00; A01K 1/0263; A01K 11/006
USPC .............. 340/539.13, 573.3, 686.1; 119/712, 119/719, 720
See application file for complete search history.

(56) References Cited

U.S. PATENT DOCUMENTS

| | | | | |
|---|---|---|---|---|
| 4,802,482 A | * | 2/1989 | Gonda et al. | 119/720 |
| 5,161,485 A | * | 11/1992 | McDade | 119/859 |
| 5,207,178 A | * | 5/1993 | McDade et al. | 119/859 |
| 5,559,498 A | * | 9/1996 | Westrick et al. | 340/573.3 |
| 5,586,521 A | * | 12/1996 | Kelley | 119/858 |
| 5,815,077 A | * | 9/1998 | Christiansen | 340/573.3 |
| 5,857,433 A | | 1/1999 | Files | |
| 5,923,254 A | * | 7/1999 | Brune | 340/573.3 |
| 5,949,350 A | * | 9/1999 | Girard et al. | 340/8.1 |
| 7,562,640 B2 | * | 7/2009 | Lalor | 119/719 |
| 7,602,302 B2 | * | 10/2009 | Hokuf et al. | 340/573.3 |
| 7,705,736 B1 | * | 4/2010 | Kedziora | 340/573.3 |
| 2005/0035865 A1 | * | 2/2005 | Brennan et al. | 340/573.3 |
| 2008/0163827 A1 | * | 7/2008 | Goetzl | 119/712 |
| 2010/0154721 A1 | | 6/2010 | Gerig et al. | |
| 2010/0231391 A1 | | 9/2010 | Dror et al. | |
| 2010/0315241 A1 | | 12/2010 | Jow | |
| 2012/0037088 A1 | | 2/2012 | Altenhofen | |

* cited by examiner

*Primary Examiner* — Steven Lim
*Assistant Examiner* — Ryan Sherwin
(74) *Attorney, Agent, or Firm* — Baker, Donelson, Bearman, Caldwell & Berkowitz, P.C.

(57) ABSTRACT

A system and apparatus to track and control an animal, including a tracking unit to track the animal, and a stimulus unit to provide a stimulus to the animal, wherein the tracking unit and stimulus unit are configured to be removably coupled together, and the tracking unit and/or stimulus unit communicate with a common control device.

31 Claims, 12 Drawing Sheets

DOCKING SYSTEM AND APPARATUS TO TRACK AND STIMULATE AN ANIMAL

CROSS-REFERENCE TO RELATED APPLICATIONS

Not Applicable

FIELD OF INVENTION

The present general inventive concept relates generally to an apparatus and system to track and stimulate animals, and, more particularly, to an apparatus and system with a tracking unit that docks with a stimulation unit to allow control by a single control device.

BACKGROUND

In order to train and/or control an animal, numerous collar mounted stimulation devices have been developed and marketed throughout the pet industry. The large majority of such conventional devices have typically been grouped together under the general category of dog training systems. The conventional stimulation devices deliver stimulation to the animal in the form of shock, sound, vibration, spray, etc., to correct any of a variety of behaviors. Such stimulation devices are typically controlled by a variety of methods such as auto activation based on feedback picked up from the animal by sensors in the collar mounted device, manual control provided by a wireless link between the collar mounted device and a remote handheld unit, or a combination of both.

In addition to the need to train or control an animal's behavior, there is also a need to track an animal's location and movement in real time. As discussed in regard to the animal training systems, a great deal of the development and marketing of animal tracking in the pet industry has been in the field of dog location systems. Dog location systems can typically be divided into three technologies; telemetry based, GNSS (Global Network Satellite Systems)/telemetry based, and GNSS/cell phone based.

Regardless of the stimulation system used, or the tracking technology used, it is common for a user to want to use an animal training system in conjunction with an animal tracking system for the same animal. However, conventional animal training and tracking systems typically require the user to employ two separate systems for the same animal, one system to provide the animal training, i.e., the stimulus, and another system to provide the animal tracking. Each of these systems operate independently and requires its own control device, such as two separate dedicated wireless remote handheld control units.

Due to the amount of space and time needed to mount two separate systems to an animal, and the complexity of having to manage two control devices, such as two remote handheld controls, there is a burden on the user that has to use both systems. As such, there would be a benefit in combining both the animal tracking and training systems in order to simplify the mounting of the two systems on an animal, and also simplifying the use of the control devices such that the user is not required to use two remote handheld control units.

BRIEF SUMMARY

The present general inventive concept provides a system and apparatus to track and/or control an animal using a tracking unit and a stimulus unit that are removably coupled together and controlled by a common device.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by an animal tracking and control apparatus including a tracking unit to track an animal, and a stimulus unit to provide a stimulus to the animal, wherein the tracking unit and stimulus unit are configured to be removably coupled together, and the tracking unit and/or stimulus unit communicate with a common control device.

The tracking unit or the stimulus unit may be fixed to an animal encircling device.

The tracking unit may be a Global Navigation Satellite Systems (GNSS) device that provides location information to the control device.

The stimulus unit may be provided with one or more protrusions to contact a skin surface of the animal.

One of the tracking unit or the stimulus unit may be provided with a receiving portion, and another of the tracking unit or the stimulus unit may be provided with an extending portion that is received by the receiving portion to couple the tracking unit and the stimulus unit together.

The extending portion and receiving portion may be provided in a dovetail configuration, and may be slidably connected to couple the tracking unit and the stimulus unit together.

The tracking unit and the stimulus unit may be further secured together by one or more adhesion members.

The one or more adhesion members may be one or more screws.

The apparatus may further include a removable cover configured to be at least partially received by the receiving portion if the tracking unit and the stimulus unit are not coupled together.

The cover may be provided with a dovetail protrusion that may be slidably received by the receiving portion.

The cover may be secured in the receiving portion by one or more adhesion members.

The one or more adhesion members may be one or more screws.

The foregoing and/or other aspects and advantages of the present general inventive concept may also be achieved by a system to track and control an animal, including a tracking unit to track an animal, a stimulus unit to provide a stimulus to the animal, and a control device to communicate with the tracking unit and/or stimulus unit, wherein the tracking unit and stimulus unit are configured to be removably coupled together.

The tracking unit or the stimulus unit may be fixed to an animal encircling device.

The tracking unit may be a Global Navigation Satellite Systems (GNSS) device that provides location information to the control device.

The stimulus unit may be provided with one or more protrusions to contact a skin surface of the animal.

One of the tracking unit or the stimulus unit may be provided with a receiving portion, and another of the tracking unit or the stimulus unit may be provided with an extending portion that is received by the receiving portion to couple the tracking unit and the stimulus unit together.

The extending portion and receiving portion may be provided in a dovetail configuration, and may be slidably connected to couple the tracking unit and the stimulus unit together.

The tracking unit and the stimulus unit may be further secured together by one or more adhesion members.

The one or more adhesion members may be one or more screws.

The system may further include a removable cover configured to be at least partially received by the receiving portion if the tracking unit and the stimulus unit are not coupled together.

The cover may be provided with a dovetail protrusion that is slidably received by the receiving portion.

The cover may be secured in the receiving portion by one or more adhesion members.

The one or more adhesion members may be one or more screws.

The control device may be a handheld device.

The control device may be provided with a display to display tracking information and/or stimulus information corresponding to the tracking unit, the stimulus unit, the control device, or any combination thereof.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Various embodiments of the present general inventive concept, as described herein, provide an animal tracking and control apparatus having a tracking unit to track an animal, and a stimulus unit to provide a stimulus to the animal. The tracking unit and stimulus unit are configured to be removably coupled together. In other words, the tracking unit and stimulus unit are formed such that the two units are able to be docked together. The coupling of the two units may be referred to interchangeably throughout this description as docking.

The tracking unit and stimulus unit may transmit and/or receive signals from a common control device. In the various embodiments described herein, the control device is described as a remote handheld control device, or more simply a handheld device. The single handheld device communicates with both the stimulus unit and the tracking unit, and may send/receive signals to/from the units using different channels or different ID codes. Also, it is understood that the control device is not limited to the handheld device described in these embodiments.

The animal tracking and control apparatus may be provided to any animal, but is typically described as being provided to a dog in the example embodiments discussed below. For example, the animal tracking and control apparatus may be secured to an animal encircling device such as a dog collar which is worn by a dog, in order to track the dog's movements and provide a control stimulus to the dog. This is merely one non-limiting example of how the animal tracking and control apparatus may be utilized.

In an example embodiment in which the animal tracking and control apparatus is secured to the animal by an animal encircling device, such as a dog collar, either the tracking unit or the stimulus unit may be secured to the dog collar, and the other of the tracking unit or the stimulus unit is removably coupled to the unit secured to the dog collar. As an example, if the stimulus unit is secured to the dog collar, the tracking unit may be removed so that only the stimulus unit is provided to the dog wearing the dog collar. As another example, if the tracking unit is secured to the dog collar, the stimulus unit may be removed so that only the tracking unit is provided to the dog wearing the dog collar. Further, the animal tracking and control apparatus may be provided with a cover to be removably coupled to one of the tracking unit and stimulus unit in lieu of the other of the tracking unit and stimulus unit being in a coupled configuration.

In the examples illustrated and discussed throughout this description in which the animal tracking and control apparatus is secured to an animal encircling device such as a dog collar, the tracking unit is described as being secured to the animal encircling device. However, it is understood that the present general inventive concept is not limited to such a configuration, and that either of the tracking unit and stimulus unit may be secured to the animal encircling device, with the other of the tracking unit and stimulus unit configured to be removably coupled to the unit secured to the animal encircling device.

The animal encircling device may be provided to the tracking unit or the stimulus unit in any of a number of example configurations, such as a collar secured to the tracking unit or stimulus unit by securing members such as screws, a molded collar that is permanently fastened to the tracking unit or stimulus unit, a pass through woven collar, an attached woven collar, a pass through molded collar, and so on.

The animal tracking unit may operate similarly to a typical Global Navigation Satellite System (GNSS) device. Various GNSS tracking systems, which employ GNSS systems such as the Global Positioning System (GPS) of the United States, the Russian GLONASS, etc., have been typically used to monitor the movement of a mobile subject such as an animal, often relative to a selected containment area. In such systems, the position and speed of the animal are monitored through the use of the GNSS satellites, and the position and speed of the animal may be displayed on a monitoring device. If a containment area is also employed, the containment area may also be displayed on the monitoring device.

The animal stimulus unit may operate similarly to various animal control apparatuses. For instance, the animal stimulus unit may provide the animal with various stimuli such as vibrations, sound, spray, and/or the like. Further, these various stimuli may be selectively provided to the animal, and the levels of the various stimuli may be adjusted. For example, a vibration provided to a dog to control a certain behavior may be increased if the dog does not respond to the previously used level of vibration stimulus. The animal stimulus unit may be provided with one or more protrusions to extend toward the animal's skin to make contact through the coat.

The previously described control device may be a handheld device which sends/receives signals to/from the animal tracking unit and stimulus unit, and may have a display such as a graphic user interface (GUI) which may show the location of one or more animals equipped with the tracking unit and stimulus unit. The handheld device may have a plurality of controls to allow various operations such as switching the display emphasis between various animals being tracked, providing various stimuli at various levels to one or more of the animals, and so on. The handheld device may communicate with the tracking unit using a different channel than the one used to communicate with the stimulus unit.

Thus, an animal tracking and control system and apparatus according to an embodiment of the present general inventive concept provides a user with an animal tracking, animal training, or animal tracking/training system that can be user configured. In any of a number of example configurations, there is only one collar (or other animal encircling device) mounted device which is provided to the animal, and only one remote handheld control unit. The collar mounted device includes both the tracking unit and the stimulus unit in a configuration in which those units are docked together, and includes only one of the units in a configuration in which the units are not docked together. Such an apparatus and system greatly simplifies the mounting and operation of an animal training and/or tracking system. Such an apparatus and system also benefits the animal provided with the tracking and control apparatus, due to reduced bulk and weight resulting from not having to wear two separate devices with two separate securing members.

Figure 1:
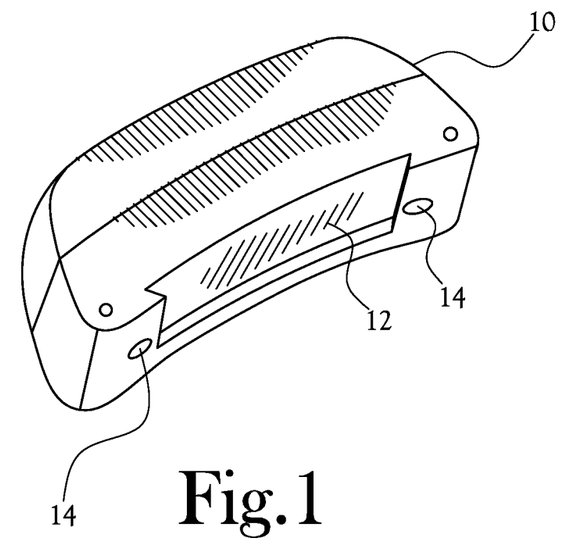
FIG. 1 illustrates a tracking unit according to an embodiment of the present general inventive concept.

FIG. 1 illustrates a tracking unit according to an embodiment of the present general inventive concept. The tracking unit 10 may receive GNSS signals and transmit position signals to a control device. In this example embodiment, the tracking unit 10 is provided with receiving portion 12 configured to receive a stimulus unit to be removably coupled to the tracking unit 10. In this example, the receiving portion is configured so as to form a dovetail connection with the coupled stimulus unit. It is understood that the dovetail connection is merely one configuration by which the tracking unit 10 will be docked with the coupled stimulus unit.

The tracking unit 10 of this example embodiment is also provided with holes 14 to receive screws to further secure the coupled stimulus unit to the tracking unit 10. Although screws are described in this example embodiment, any type of adhesion member, such as bolts, brackets, clamps, and so on, may be used to further secure the coupled, or docked, units. Also, in other example embodiments, no adhesion members may be used to further secure the docking of the units. It is understood that the shape and dimensions of the tracking unit 10, as well as the other example units illustrated in the following drawings, are merely simple examples for illustrative purposes, and corresponding units in various embodiments of the present general inventive concept may vary widely in size, shape, composition, and so on.

The tracking unit 10 may further be provided with an antenna (illustrated later in FIG. 6) or antennas (not shown) to transmit/receive GPS signals and/or signals to the control device. The antenna(s) may be integrated with an animal encircling device to which the tracking unit 10 is secured.

Figure 2:
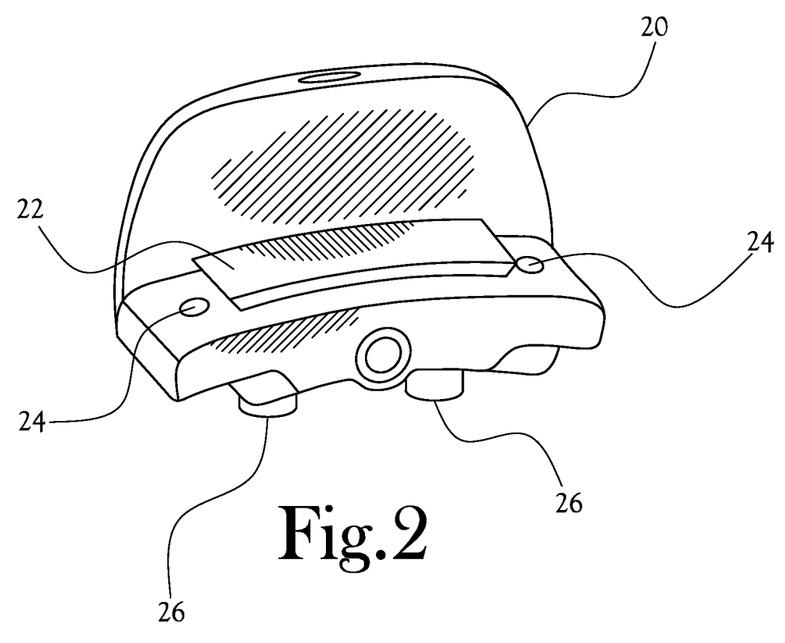
FIG. 2 illustrates a stimulus unit according to an embodiment of the present general inventive concept.

FIG. 2 illustrates a stimulus unit according to an embodiment of the present general inventive concept. The stimulus unit 20 may receive control signals from the control device which also communicates with the tracking unit 10 in order to provide a stimulus to the animal. In this example embodiment the stimulus unit is provided with an extending portion 22 configured to slide into the receiving portion 12 of the tracking unit 10 in order to dock the stimulus unit 20 to the tracking unit 10 with a dovetail connection. It is understood that either of the tracking unit 10 or the stimulus unit 20 may be provided with the receiving portion 12, with the remaining one of the tracking unit 10 or the stimulus unit 20 being provided with the extending portion 22. Also, the coupling of the units may be achieved through configurations other than a receiving portion receiving an extending portion, and/or other than a slidable connection as illustrated in these drawings.

The stimulus unit 20 of this example embodiment is provided with through holes 24 through which screws may pass to further secure the docking of the tracking unit 10 and the stimulus unit 20. The screws, or other adhesion members, pass through the through holes 24 to the holes 14 of the tracking unit 10.

The stimulus unit 20 of this example embodiment is also provided with protrusions 26 which extend from the stimulus unit 20 to contact the skin of an animal and provide a stimulus, such as a vibration. The level of the stimulus may be adjusted through the control device communicating with the stimulus unit 20. The stimulus unit 20 may further have an antenna (not shown) to be used in transmitting and/or receiving control signals from the control device. It is understood that the protrusions 26 are merely an example of how the stimulus may be delivered to the animal.

Figure 3:
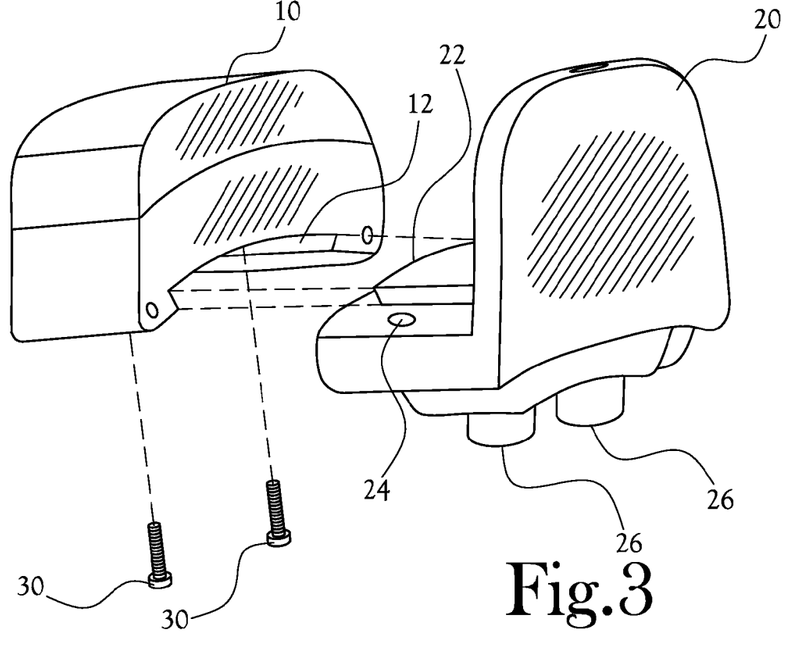
FIG. 3 illustrates the docking of the stimulus unit to the tracking unit according to an embodiment of the present general inventive concept.

FIG. 3 illustrates the docking of the stimulus unit 20 to the tracking unit 10 according to an embodiment of the present general inventive concept. As illustrated, the extending portion 22 of the stimulus unit 20 slides into the receiving portion 12 of the tracking unit 10 to form a dovetail connection. After the docking is achieved, screws 30 may be screwed into the holes 14 of the tracking unit 10 through the through holes 24 of the stimulus unit 20 in order to further secure the docking of the units.

Although not illustrated in these drawings, each of the tracking unit 10 and the stimulus unit 20 may be provided with on/off buttons, on/off indicators, charging jacks, and other similar features typically provided to electric/electronic devices. Also, the stimulus unit 20 may be provided with an internal or external antenna to be used in communication with the control device, and the tracking unit 10 may be provided with one or more internal and/or external antennas to be used in communication with the control device and/or GNSS satellites. One or more of the various antennas may be integrated with or supported by an animal encircling device to which the animal tracking and control apparatus is attached. These features have largely been omitted from the drawings to present a more clear illustration of the docking feature of the units.

Figure 4:
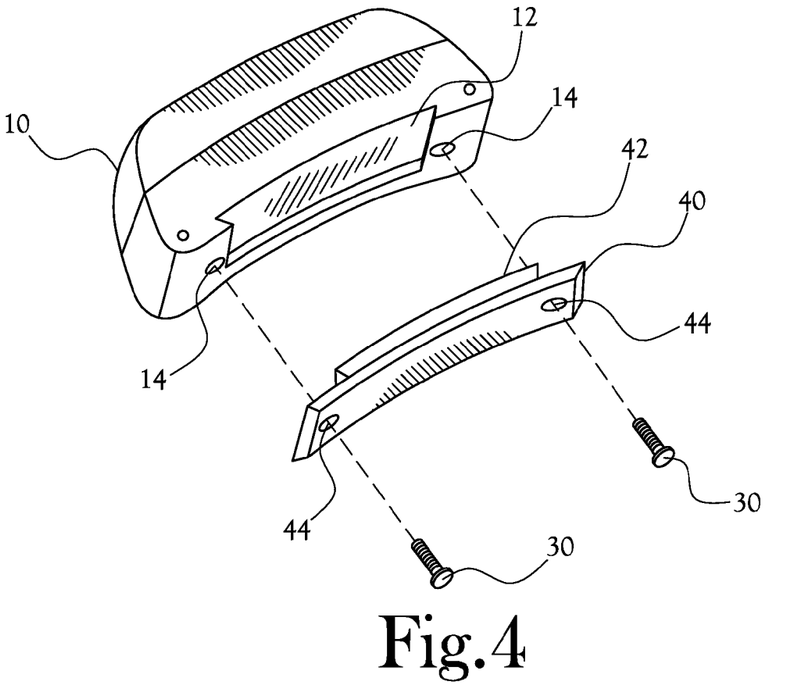
FIG. 4 illustrates a cover which may be used to cover the receiving portion of the tracking unit according to an embodiment of the present general inventive concept if the stimulus unit is not docked with the tracking unit.

FIG. 4 illustrates a cover which may be used to cover the receiving portion of the tracking unit 10 according to an embodiment of the present general inventive concept if the stimulus unit 20 is not docked with the tracking unit 10. The cover 40 is provided with an extending portion 42 that corresponds to the extending portion 22 of the stimulus unit 20, and which slides into the receiving portion 12 of the tracking unit 10 to form a dovetail connection in the same manner as that formed between the tracking unit 10 and the stimulus unit 20. The cover is also provided with through holes 44 through which the screws 30 may be screwed into the holes 14 of the tracking unit 10 to further secure the cover 40 to the tracking unit 10.

Figure 5A:
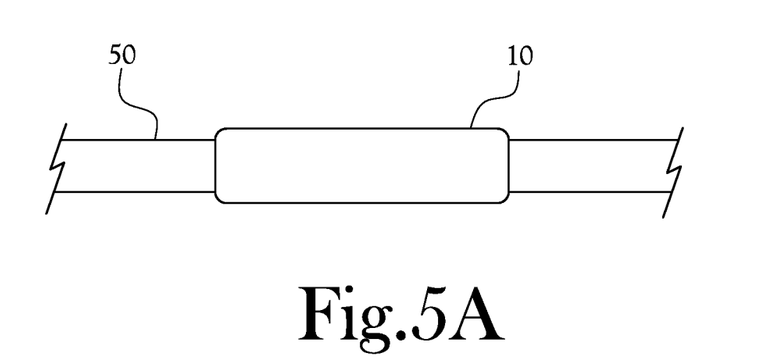
FIGS. 5A-5C illustrate the docking of the stimulus unit to the tracking unit while fixed to an animal encircling device according to an embodiment of the present general inventive concept.
Figure 5B:
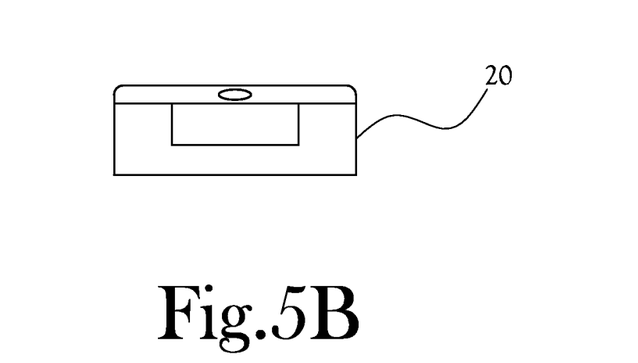
Figure 5C:
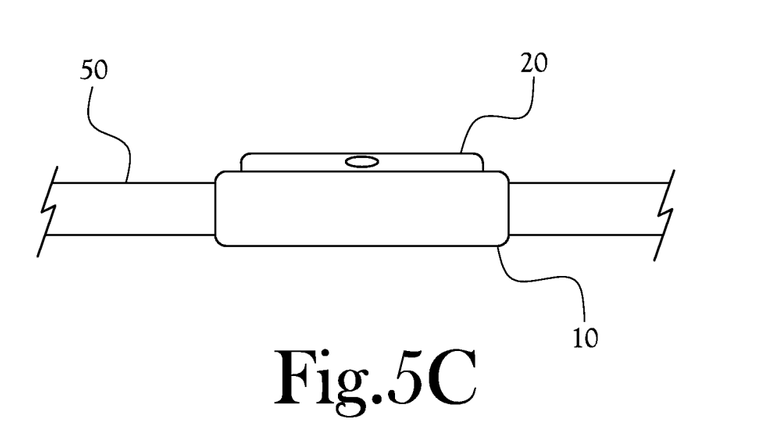

FIGS. 5A-5C illustrate the docking of the stimulus unit 20 to the tracking unit 10 while fixed to an animal encircling device 50 according to an embodiment of the present general inventive concept. These drawings are highly simplified in order to illustrate an "outside" view of the tracking unit 10 and stimulus unit 20 as provided to the animal encircling device 50 so as to be mounted on an animal. In FIG. 5A, the tracking unit 10 is fixed to the animal encircling device 50, an example of which may be a dog collar. The tracking unit 10 may be fixed to the dog collar 50 in any number of ways, and may be permanently or removably fixed to the dog collar 50. FIG. 5B is a simple "outside" view of the stimulus unit 20, the "outside" orientation indicating the view from directly outside portions of the dog collar 50 adjacent to the tracking unit 10 in FIGS. 5A and 5C. In other words, the "outside" view is that of one looking at a dog wearing the dog collar 50. FIG. 5C illustrates the stimulus unit 20 docked to the tracking unit 10.

Figure 6:
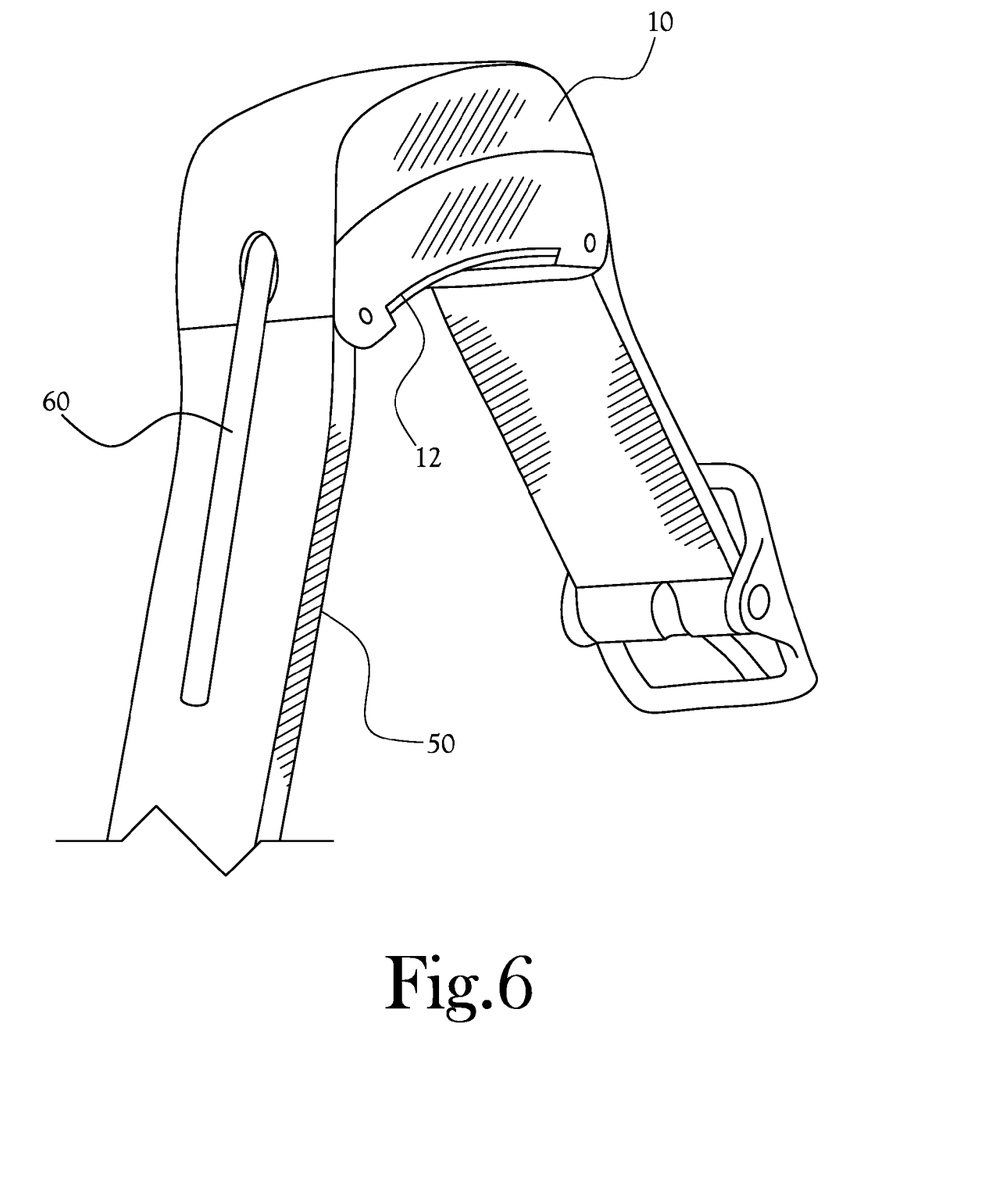
FIG. 6 illustrates another view of the tracking unit fixed to the dog collar according to an embodiment of the present general inventive concept.

FIG. 6 illustrates another view of the tracking unit 10 fixed to the dog collar 50 according to an embodiment of the present general inventive concept. As illustrated in FIG. 6, the receiving portion 12 of the tracking unit 10 is located on the inner side of the tracking unit 10, which is the side of the tracking unit that is facing the animal, e.g., the dog. The tracking unit 10 is able to track the dog and communicate with the control device regardless of whether the stimulus unit 20 is docked with the tracking unit 10. FIG. 6 also illustrates an antenna 60 provided to the tracking unit 10, which has been omitted from various other illustrated embodiments for the sake of clarity. As previously described, the tracking unit may be provided with more than one antenna.

Figure 7:
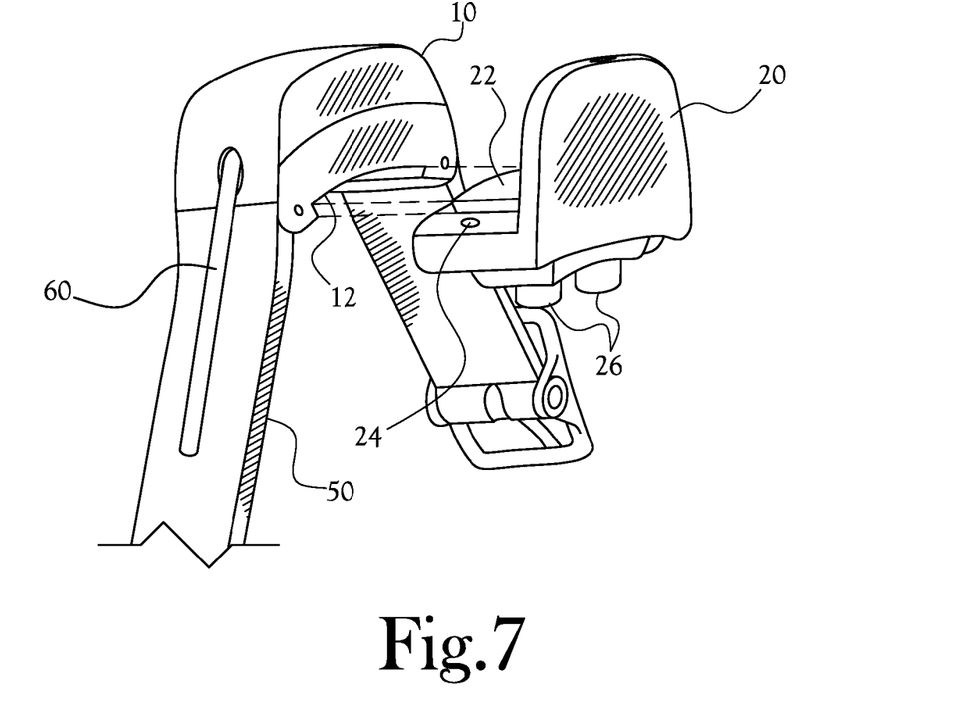
FIG. 7 illustrates another view of the docking of the stimulus unit to the tracking unit according to an embodiment of the present general inventive concept.

FIG. 7 illustrates another view of the docking of the stimulus unit 20 to the tracking unit 10 according to an embodiment of the present general inventive concept. As illustrated in FIG. 7, the extending portion 22 of the stimulus unit 20 slides into the receiving portion 12 of the tracking unit 10 to dock the units in a dovetail connection. Once docked, the protrusions 26 extend away from the tracking unit 10 and stimulus unit 20 toward the dog wearing the dog collar 50.

Figure 8:
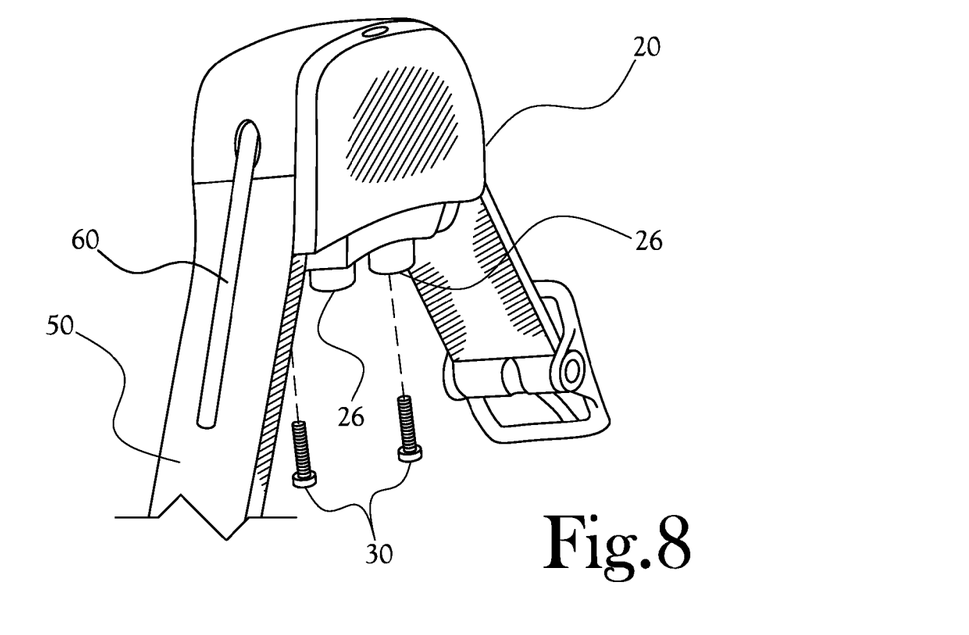
FIG. 8 illustrates the securing of the docking illustrated in FIG. 7 according to an embodiment of the present general inventive concept.

FIG. 8 illustrates the securing of the docking illustrated in FIG. 7 according to an embodiment of the present general inventive concept. As illustrated in FIG. 8, the screws 30 pass through the through holes 24 of the stimulus unit 20 to screw into the holes 14 of the tracking unit 10. While the screws 30 further secure the docking of the stimulus unit 20 to the tracking unit 10, it is understood that such further securing and adhesion members are not required in other various embodiments of the present general inventive concept.

Figure 9:
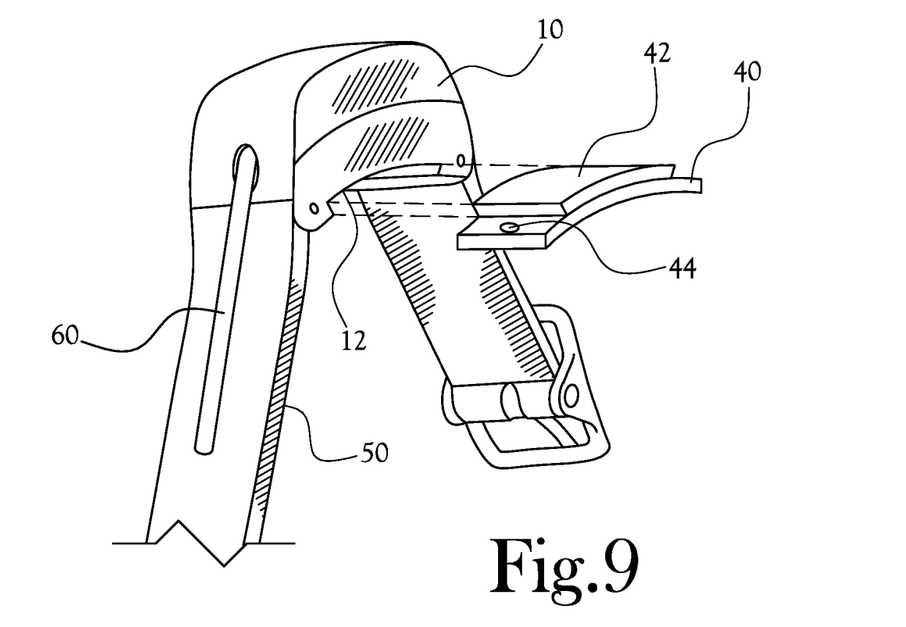
FIG. 9 illustrates the cover being coupled to the tracking unit of FIG. 6 according to an embodiment of the present general inventive concept.

FIG. 9 illustrates the cover 40 being coupled to the tracking unit 10 of FIG. 6 according to an embodiment of the present general inventive concept. As illustrated in FIG. 9, the extending portion 42 of the cover 40 slides into the receiving portion 12 of the tracking unit 10 to couple the cover to the tracking unit 10 in a dovetail connection. The use of the cover 40, in the absence of the stimulus unit 20, provides a smooth contact surface to increase the comfort of the dog wearing the dog collar 50.

Figure 10:
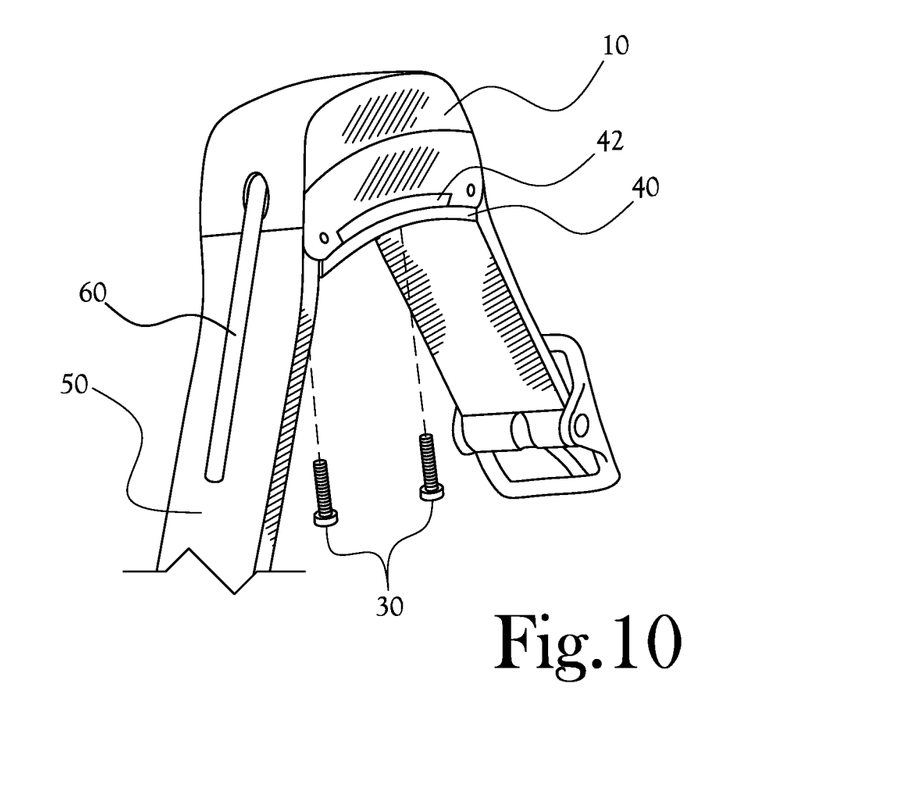
FIG. 10 illustrates the securing of the cover illustrated in FIG. 9 according to an embodiment of the present general inventive concept.

FIG. 10 illustrates the securing of the cover 40 illustrated in FIG. 9 according to an embodiment of the present general inventive concept. As illustrated in FIG. 10, the screws 30 pass through the through holes 44 of the cover 40 to screw into the holes 14 of the tracking unit 10. While the screws 30 further secure the cover 40 to the tracking unit 10, it is understood that such further securing and adhesion members are not required in other various embodiments of the present general inventive concept.

Figure 11:
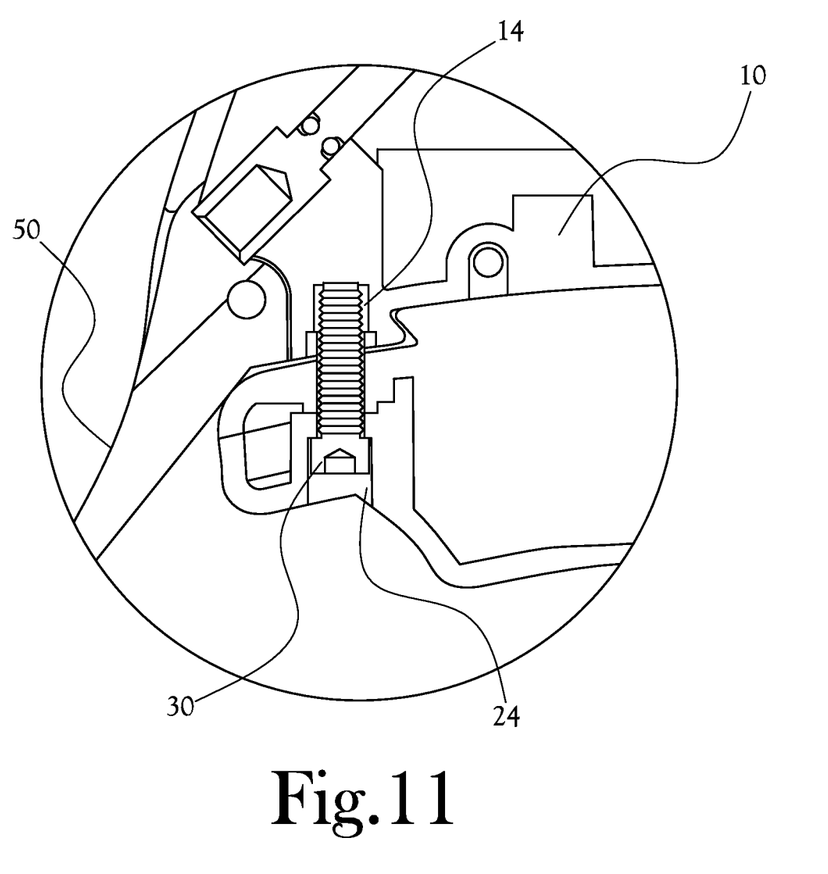
FIG. 11 illustrates a partial cross-section of the docked tracking unit and stimulus unit according to an embodiment of the present general inventive concept.

FIG. 11 illustrates a partial cross-section of the docked tracking unit 10 and stimulus unit 20 according to an embodiment of the present general inventive concept. As illustrated in FIG. 11, the screw 30 is extends through the through hole 24 of the stimulus unit 20 to screw into the hole 14 of the tracking unit 10, further securing the docking of the stimulus unit 20 and the tracking unit 10. While the screws 30 further secure the docking of the stimulus unit 20 to the tracking unit 10, it is understood that such further securing and adhesion members are not required in other various embodiments of the present general inventive concept.

Figure 12:
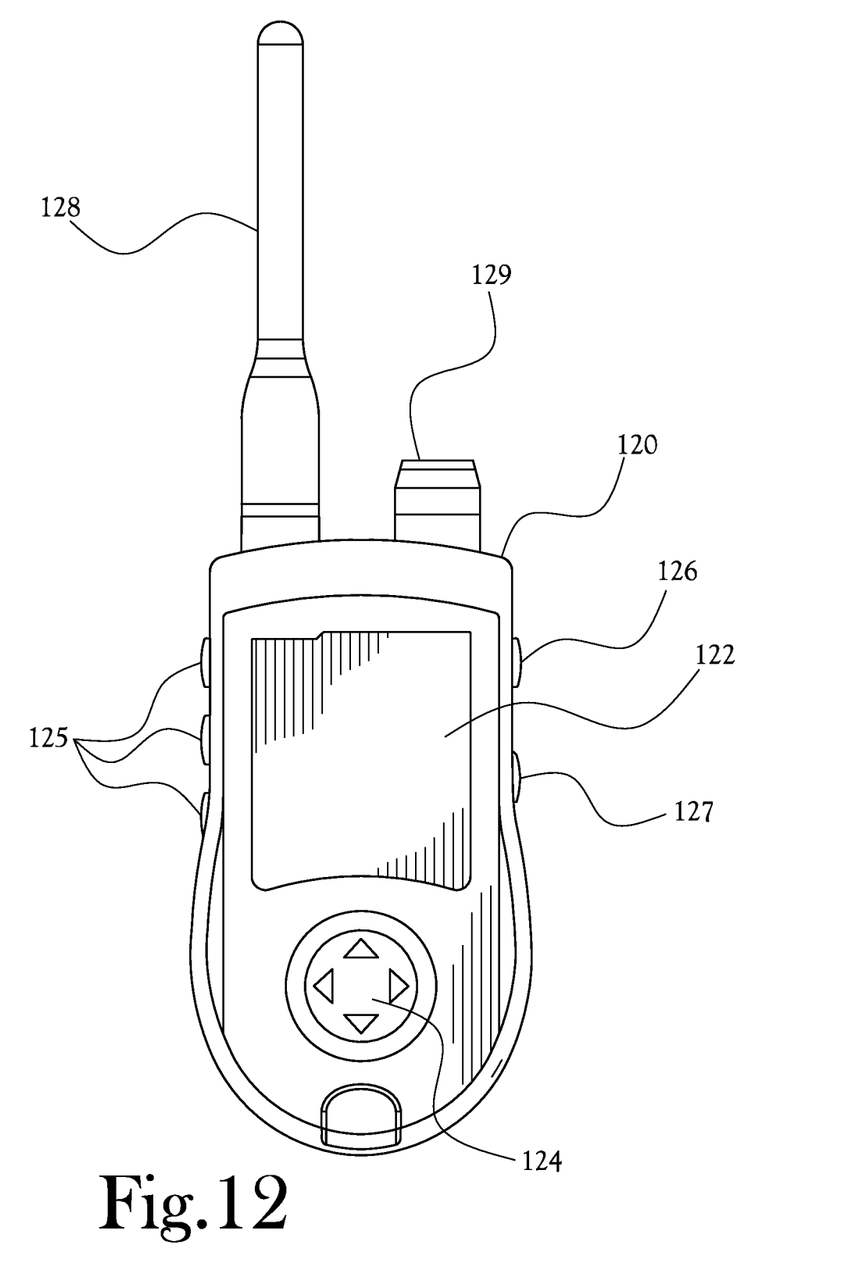
FIG. 12 illustrates a control device to control the tracking unit and the stimulus unit according to an embodiment of the present general inventive concept.

FIG. 12 illustrates a control device to control the tracking unit 10 and the stimulus unit 20 according to an embodiment of the present general inventive concept. As illustrated in FIG. 12, this example control device 120 is a remote handheld control device. The control device 120 is provided with a display 122 to display a graphical user interface (GUI), a direction button 124 to interface with the GUI, a plurality of stimulus buttons 125, a back button 126, a tracking/training toggle button 127, a GNSS antenna 128, and a control device antenna 129.

The control device 120 determines a user's location from a built-in GPS antenna, and receives location updates from the GPS antenna provided to the tracking unit 10 to track the location of the animal equipped with the tracking and control apparatus. The GPS antenna provided to the tracking unit 110 may be mounted on the dog collar 50. The display 122 may display the user's location, the location of one or more animals provided with the animal tracking and control apparatus relative to the user or to a predetermined area, a list of options for stimulating the respective animals, levels of stimulation, and so on. The stimulus buttons 125 may be used to send a signal to activate the stimulus unit 20 to deliver a stimulus to the animal. As previously described, the level of the stimulus is adjustable through the control device 120.

The control device may communicate with the tracking unit 10 and the stimulus unit 20 on separate channels in order to minimize interference between the respective signals.

FIGS. 13 to 16 illustrate various displays and graphical heading indicators, configured in accordance with example embodiments of the present general inventive concept, which may be displayed on the control device 120 according to various examples.

Referring to FIGS. 13 to 16, the example display screens provided by the control device 120 include tracking information for three different dogs, as generally represented by the display icons corresponding to the current direction and location of the animal and/or past locations and directions of the animal. In the example embodiments, the animals being tracked are referred to in some of the figures as Ripley, Talon, and Lulu, respectively. Note that the present general inventive concept is not limited to any particular number of tracked animals. Moreover, although the example embodiments of FIGS. 13-16 illustrate various different dogs being tracked, the present general inventive concept is not limited to any particular number or type of animal.

Figure 13:
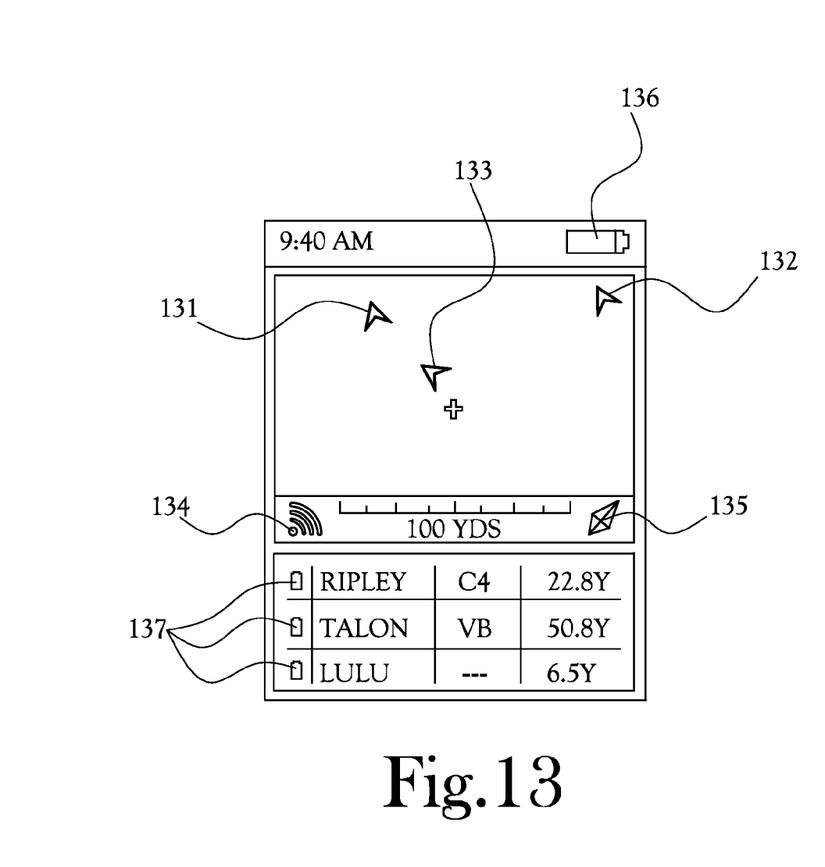
FIG. 13 illustrates a display screen generated by the control device according to an example embodiment of the present general inventive concept.

FIG. 13 illustrates a display screen generated by the control device 120 according to an example embodiment of the present general inventive concept. Referring to FIG. 13, the three different direction indicator arrows correspond to the current location and direction, or heading, of the respective animals relative to the user's position. The cross-hair in the middle of the screen can be used to represent the current location of the user, although the present general inventive concept is not limited to any particular type of graphical indicators, or icons, to represent the animal and user. For example, the graphical representations of the animals could take the form of an animal-shaped icon. In various example embodiments, the head of the animal could be used to indicate the current direction of the animal, and the body of the animal could be used to indicate the current location of the animal based on the current scale of the display screen. The icons can indicate whether the dog is running, on point, treed, stationary, barking, and the like, and the movement of the user.

Although the user's location is represented in the illustrated embodiments as a cross-hair, it is possible to display the location and heading of the user using any number of icons, such as a human figure, arrow, circle, or other icon. The orientation of the direction arrow (e.g., up, down, left right, etc.) can represent the current heading or direction of the animal and user relative to one another, and the icons can be color coded so the user knows which icon corresponds to each dog by the color of the icon matching the color of the text.

The display can include an incremented scale to provide a visual representation of the actual distance between the user and the respective animals, and can display the actual calculated distances from the user for each animal. The user has the option to keep the scale at a fixed distance (e.g., 100 yards), or the user can select Auto where the scale will automatically adjust in real time once the animal goes outside the scale. The unit can periodically check to see if any of the animals are outside the scale and can zoom to a level where all the animals are visible on the screen. If the animal is lost or off-screen, a graphical indicator, such as an outline of the icon or a blinking icon representing the animal can be provided to the user, or a separate tab can be provided showing the animal's location in relation to the scaled display.

Referring to FIG. 13, Ripley is represented as 131, Talon as 132, and Lulu as 133. As indicated in FIG. 13, Ripley 131 is shown located 22.8 yards from the user and provided with continuous stimulation C4 according to one of the stimulus buttons 125; Talon 132 is shown located 50.8 yards from the user and provided with vibration stimulation VB according to one of the stimulus buttons 125; and Lulu 133 is shown located 6.5 yards from the user with no stimulation provided. The stimulation buttons 125 of the control device 120 can be selectively assigned to each dog, respectively, and used to provide the corresponding stimulus as desired by the user. The display can include a GPS fix indicator 134, compass indicator 135, and battery indicator 136. The display can also include separate battery level indicators 137 corresponding to the battery level of the individual GPS units, respectively. In various example embodiments, the GPS fix indicator 134 can indicate whether the control device 120 has achieved a 'fix' on the animals as determined by a GPS engine. The compass indicator 135 can indicate the current orientation of the control device 120 as determined by the compass unit.

Figure 14:
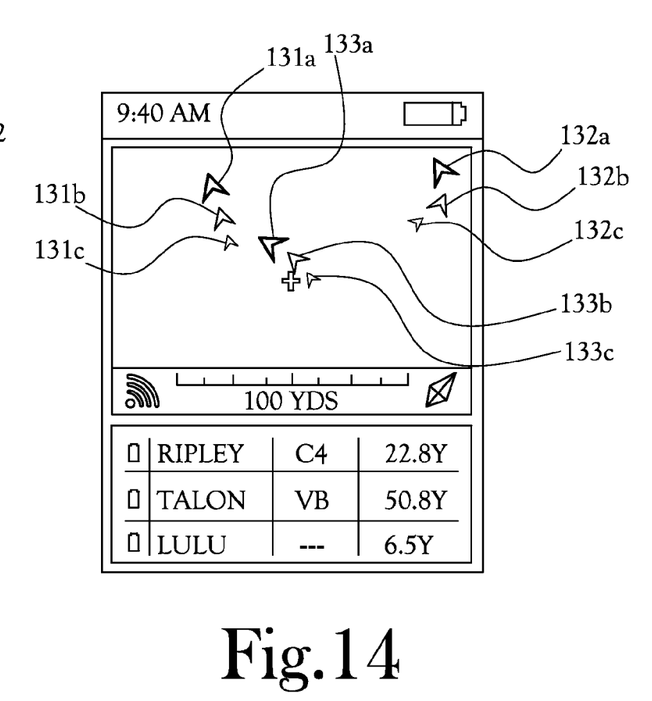
FIG. 14 illustrates a display screen generated by the control device according to another example embodiment of the present general inventive concept.

FIG. 14 illustrates a display screen generated by the control device 120 according to another example embodiment of the present general inventive concept. In FIG. 14, similar to FIG. 13, the three large direction indicator arrows correspond to the current location and direction of the animals relative to the user's position. However, FIG. 14 includes a plurality of additional and smaller indicator arrows 131a, 131b, 131c; 132a, 132b, 132c; 133a, 133b, 133c, corresponding to a plurality of historical data points relative to each animal's movement. These additional data points are represented in the form of smaller (i.e., subdued) arrows, although any other shape, number, and/or size of icons could be used. In FIG. 14, the smaller historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping as well as current location and direction information of the animal's movement relative to the user.

Figure 15:
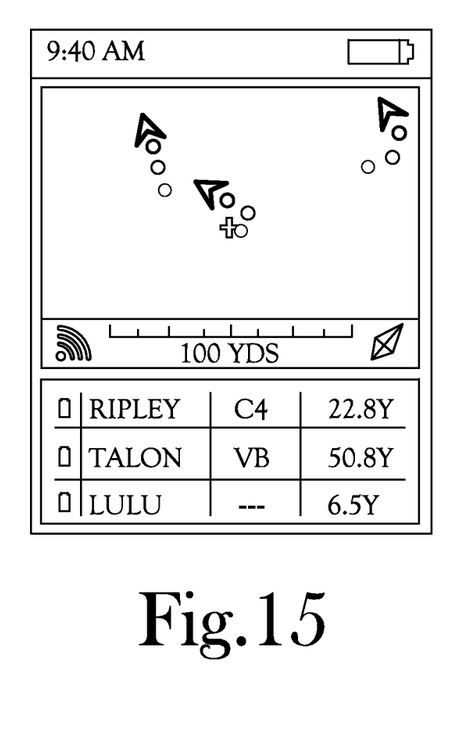
FIG. 15 illustrates a display screen generated by the control device according to yet another example embodiment of the present general inventive concept.

FIG. 15 illustrates a display screen generated by the control device 120 according to another example embodiment of the present general inventive concept. In FIG. 15, similar to FIGS. 13 and 14, the three large direction indicator arrows correspond to the current location and direction of the animals relative to the user's position. However, FIG. 15 includes a plurality of circles corresponding to historical data points relative to the animal's movement. Although these additional data points are represented in the form of circles, any other shape, size, and number of icons could be used. In FIG. 15, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, similar to the example embodiment of FIG. 14, the movement and data points transmitted by the first device can be received and displayed by the second device to provide a historical mapping as well as current location and direction information of the animal's movement relative to the user.

Figure 16:
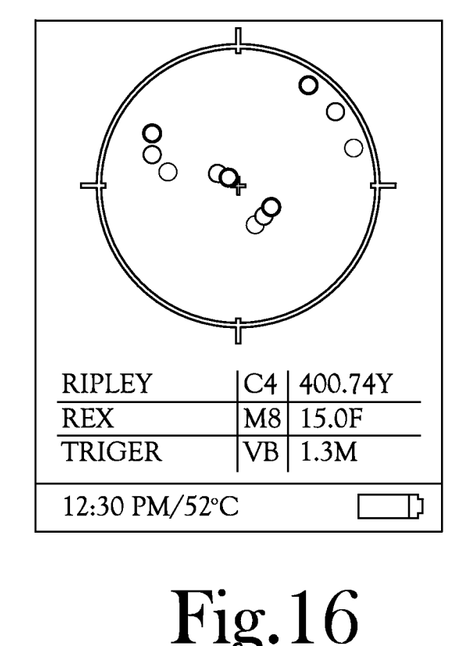
FIG. 16 illustrates a display screen generated by the control device according to another example embodiment of the present general inventive concept.

FIG. 16 illustrates a display screen generated by the control device 120 according to another example embodiment of the present general inventive concept. FIG. 16 includes a plurality of circles corresponding to historical data points relative to the animal's movement, but does not include the three large indicator arrows. These historical data points are represented in the form of circles, although any other shape, size, and number could be used. In FIG. 16, similar to FIG. 15, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping of the animal's movement relative to the user, with the most recent circle also providing the current location of the first device.

In the example embodiments, the change of position between the most recent data point and the prior data point can be used to provide a directional vector, or indicator, indicating the dog's recent movement. This vector information can be used to graphically display the dog's current heading in relation to the user. In the example embodiments, the dog's current heading can be indicated by an arrow while the historical location data points are displayed as dots or circles, although it is possible that any other shape or number of data points could be used without departing from the broader scope and teachings of the present general inventive concept.

The user can select to display a complete history of the paths taken by the respective animals, a partial history, or no history at all. The historical paths can take the form of a series of icons, historical data points, or a continuous path line or bread-crumb trail to show the path of the animal over time. For example, if the screen becomes cluttered with numerous paths, the user can selectively choose the length of paths shown, or no paths shown. The handheld can be programmed to automatically refresh the display screen at predetermined intervals or lengths of trails to maintain a fresh looking display.

Figure 17:
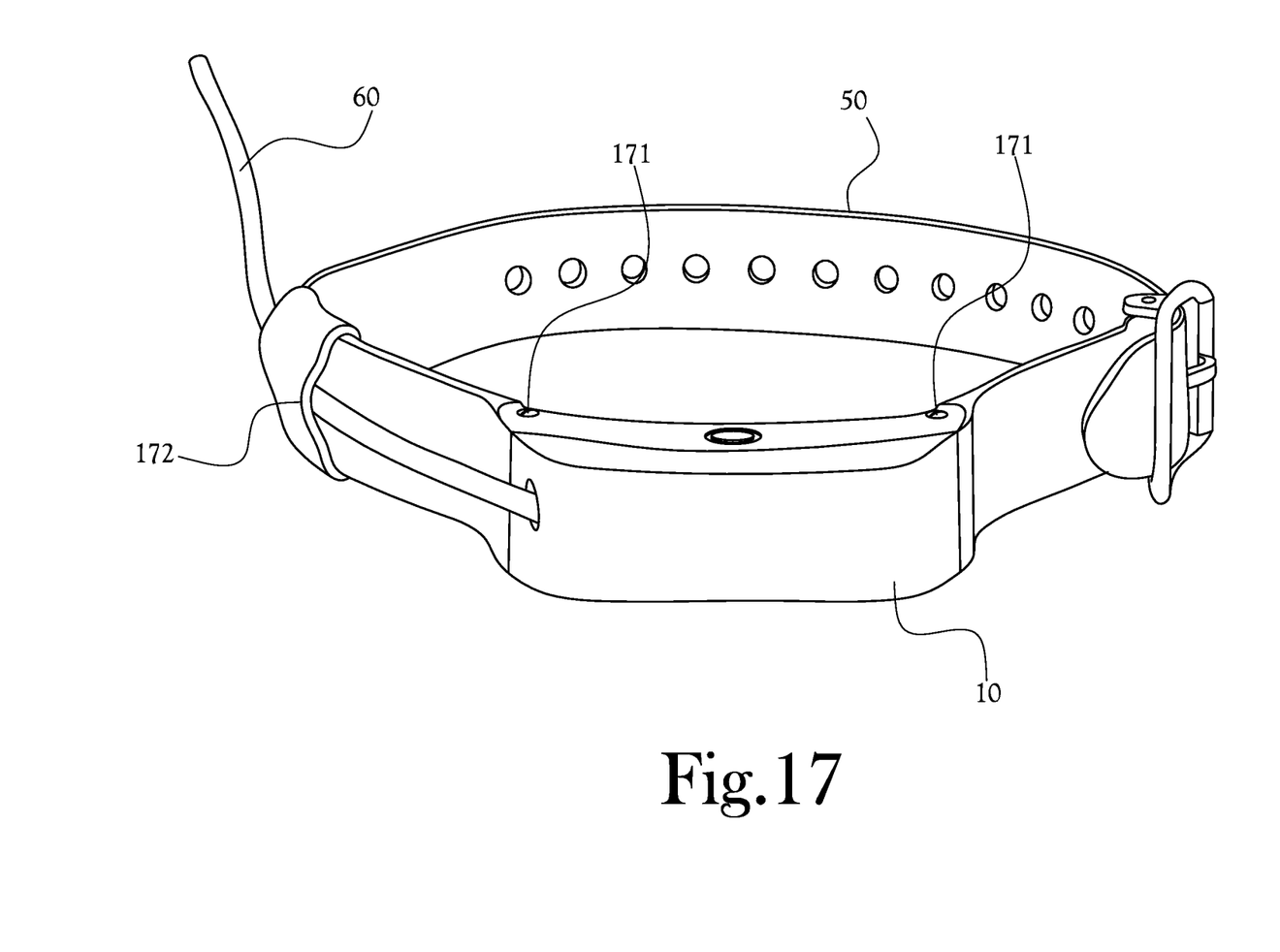
FIG. 17 illustrates another view of the tracking unit provided to the dog collar as illustrated in FIG. 6.

FIG. 17 illustrates another view of the tracking unit 10 provided to the dog collar 50 as illustrated in FIG. 6. In FIG. 17, which shows an entirety of the dog collar 50, the dog collar 50 is fixed to the tracking unit 10 with screws 171. The animal encircling device 50 may be provided with a loop 172 to secure a positioning of the antenna 60. As previously described, while the tracking unit 10 is illustrated as being the unit attached to the dog collar 50, other embodiments of the present general inventive concept may include the stimulus unit 20 attached to the dog collar 50, rather than the tracking unit 10.

Figure 18:
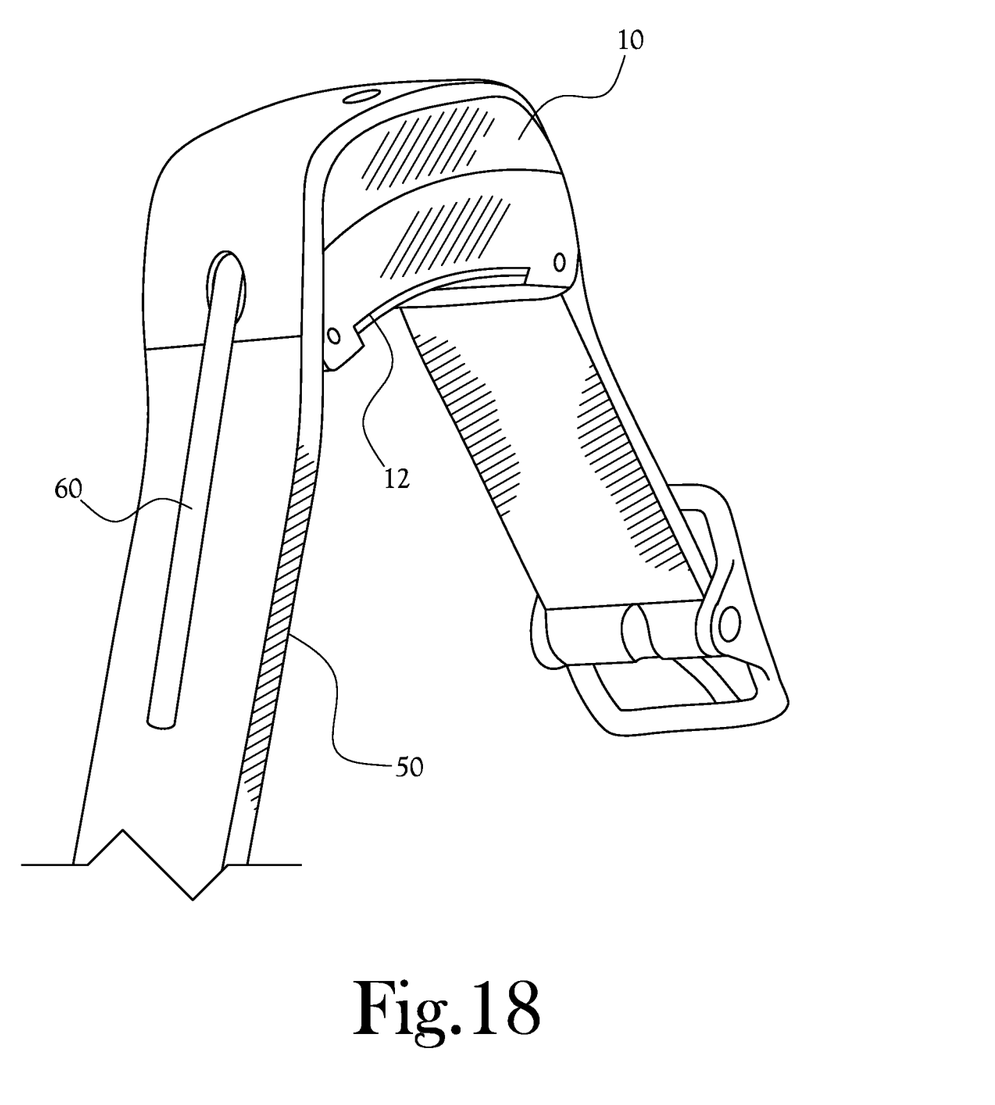
FIG. 18 illustrates a view of the tracking unit fixed to the dog collar according to another embodiment of the present general inventive concept.

FIG. 18 illustrates a view of the tracking unit 10 fixed to the dog collar 50 according to another embodiment of the present general inventive concept. FIG. 18 is similar to FIG. 6 except that dog collar 50 wraps over the tracking unit 10 on a surface facing away from the dog, rather than being fixed to ends of the tracking unit 50 with screws 171 as in FIG. 17. As previously described, any number of collars and methods of fixing the collars to the tracking unit 10 may be used with the present general inventive concept.

According to various embodiments of the present general inventive concept, an animal tracking and control system and apparatus provides a user with an animal tracking, animal training, or animal tracking/training system that can be user configured. In any of a number of example configurations, there is only one collar (or other animal encircling device) mounted device which is provided to the animal, and only one control device to control the mounted device. The control device may be a remote handheld control unit. The collar mounted device includes both the tracking unit and the stimulus unit in a configuration in which those units are docked together, and includes only one of the units in a configuration in which the units are not docked together. Such an apparatus and system greatly simplifies the mounting and operation of an animal training and/or tracking system. Such an apparatus and system also benefits the animal provided with the tracking and control apparatus, due to reduced bulk and weight resulting from not having to wear two separate devices with two separate securing members.

The concepts and techniques disclosed herein are not limited to the tracking and control of animals, and could be applied to various other applications and objects, without departing from the scope and spirit of the present general inventive concept. For example, although the description discusses a dog collar worn by a dog, the present general inventive concept is not limited to any particular type of animal, and further may be used by a human or mechanical mobile subject.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. An animal tracking and control apparatus, comprising:
a tracking unit for tracking an animal; and
a stimulus unit to provide a stimulus to the animal, wherein the tracking unit and stimulus unit are configured to removably couple with each other, wherein a first unit of the tracking unit and the stimulus unit is affixed to an animal encircling device; and
a common control device remote to the tracking unit and the stimulus unit, configured to communicate with the tracking unit using a first channel and to communicate with the stimulus unit using a second channel, wherein the common control device communicates with the first unit, wherein the first channel is different than the second channel.

2. The apparatus of claim 1, wherein one of the tracking unit and the stimulus unit includes a receiving portion, and the other of of the tracking unit and the stimulus unit includes an extending portion, wherein the receiving portion receives the extending portion to couple the tracking unit and the stimulus unit together.

3. The apparatus of claim 2, wherein the extending portion and receiving portion slidably couple in a dovetail configuration.

4. The apparatus of claim 2, wherein adhesion members secure the tracking unit and the stimulus unit together.

5. The apparatus of claim 4, wherein the one or more adhesion members comprise one or more screws.

6. The apparatus of claim 5, comprising a removable cover coupled to the first unit, the first unit including either an extending portion or a receiving portion.

7. The apparatus of claim 6, wherein the removable cover slidably couples with the first unit in a dovetail configuration.

8. The apparatus of claim 6, wherein the removable cover is secured to the first unit by one or more adhesion members.

9. The apparatus of claim 8, wherein the one or more adhesion members comprise one or more screws.

10. The apparatus of claim 1, wherein the remaining unit of the tracking unit and the stimulus unit is removably coupled to the first unit, wherein the common control device communicates with the remaining unit.

11. The apparatus of claim 1, wherein the animal encircling device comprises a collar.

12. The apparatus of claim 1, wherein the tracking unit is a Global Navigation Satellite Systems (GNSS) device providing location information of the tracking unit to the common control device.

13. The apparatus of claim 1, wherein the stimulus unit comprises one or more protrusions to contact a skin surface of the animal.

14. The apparatus of claim 13, wherein the stimulus unit receives one or more control signals from the common control device, the receiving the one or more control signals comprising providing the stimulus to the animal.

15. A system to track and control an animal comprising,
a tracking unit for tracking an animal;
a stimulus unit for providing a stimulus to the animal, wherein the tracking unit and stimulus unit are configured to removably couple together, wherein a first unit of the tracking and stimulus units is affixed to an animal encircling device; and
a control device configured to communicate with the tracking unit using a first channel and configured to communicate with the stimulus unit using a second channel, wherein the control device communicates with the first unit, wherein the first channel is different than the second channel.

16. The system of claim 15, wherein one of the tracking unit and the stimulus unit includes a receiving portion, and the other of the tracking unit and the stimulus unit includes an extending portion, wherein the receiving portion receives the extending portion to couple the tracking unit and the stimulus unit together.

17. The system of claim 16, wherein the extending portion and receiving portion slidably couple in a dovetail configuration.

18. The system of claim 16, wherein adhesion members secure the tracking unit and the stimulus unit together.

19. The system of claim 18, wherein the one or more adhesion members comprise one or more screws.

20. The system of claim 19, comprising a removable cover coupled to the first unit, the first unit including either an extending portion or a receiving portion.

21. The system of claim 20, wherein the removable cover slidably couples with the first unit in a dovetail configuration.

22. The system of claim 20, wherein the removable cover is secured to the first unit by one or more adhesion members.

23. The system of claim 22, wherein the one or more adhesion members comprise one or more screws.

24. The system of claim 15, wherein the control device is a handheld device.

25. The system of claim 15, wherein the control device includes a display to display one or more of tracking information of the tracking unit and stimulus information of the stimulus unit.

26. The apparatus of claim 15, wherein the remaining unit of the tracking unit and the stimulus unit is removably coupled to the first unit, wherein the common control device communicates with the remaining unit.

27. The system of claim 15, wherein the animal encircling device comprises a collar.

28. The system of claim 15, wherein the tracking unit is a Global Navigation Satellite Systems (GNSS) device providing location information of the tracking unit to the control device.

29. The system of claim 15, wherein the stimulus unit comprises one or more protrusions to contact a skin surface of the animal.

30. The system of claim 29, wherein the stimulus unit receives one or more control signals from the control device, the receiving the one or more control signals comprising providing the stimulus to the animal.

31. The system of claim 30, wherein the one or more control signals from the control device comprises a level of stimulus.

* * * * *